UNITED STATES PATENT OFFICE.

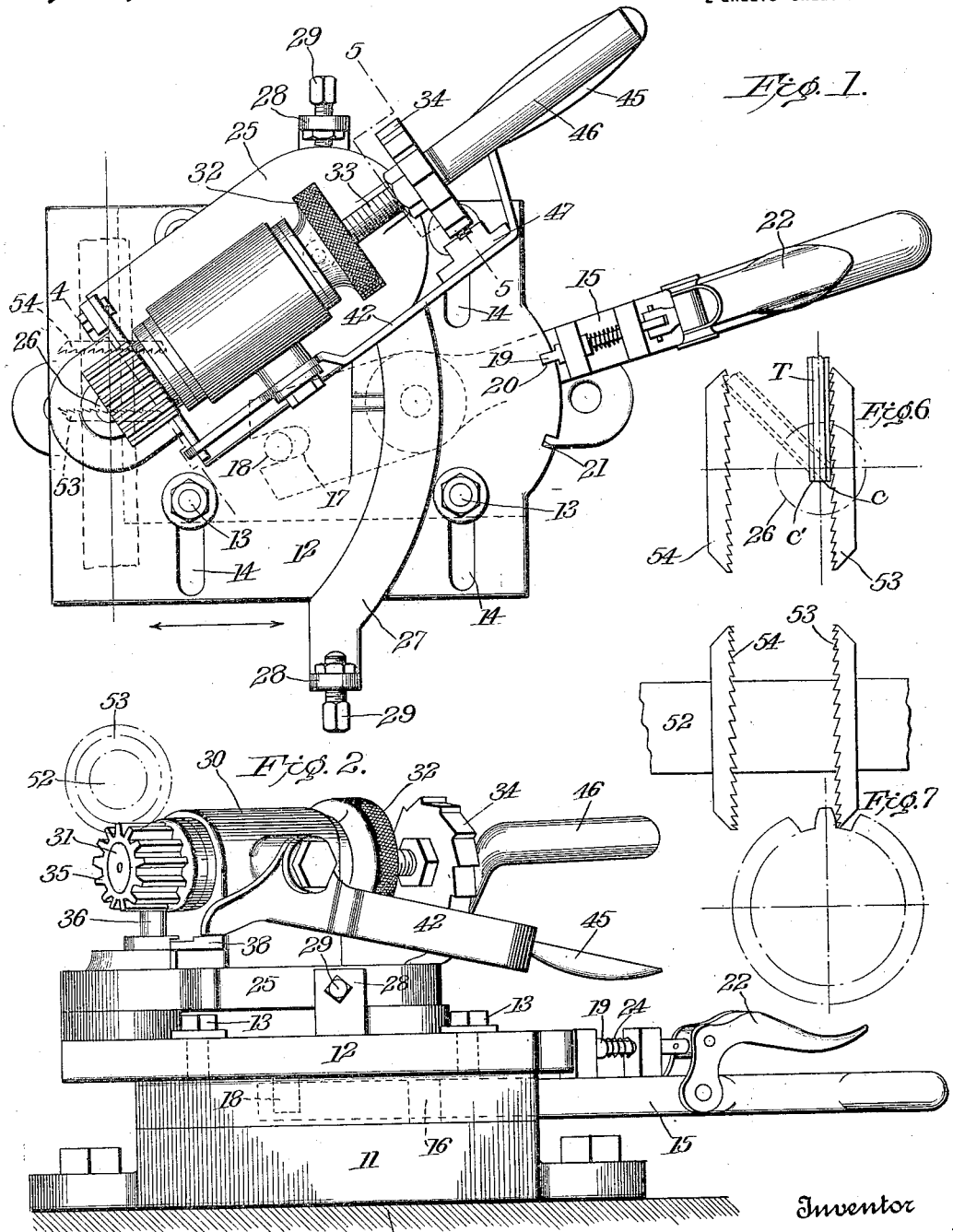

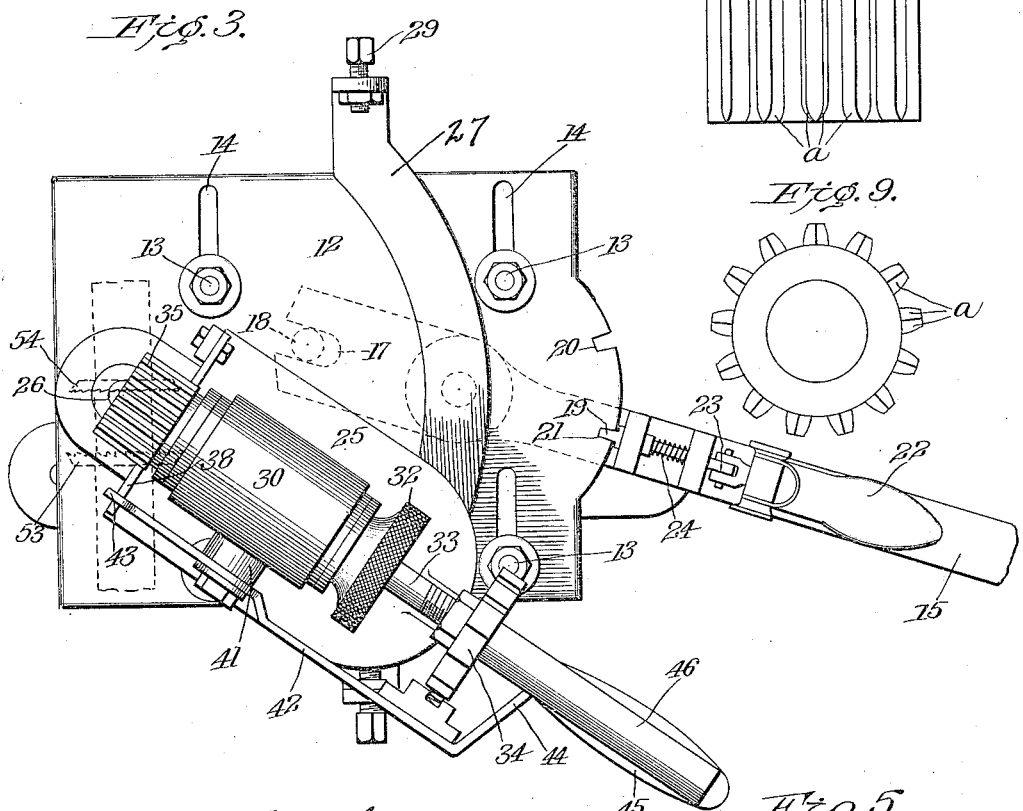

HENRY E. VAN NESS, OF ELMIRA, NEW YORK.

ATTACHMENT FOR MILLING-MACHINES.

1,138,429.   Specification of Letters Patent.   Patented May 4, 1915.

Application filed September 2, 1914. Serial No. 859,890.

*To all whom it may concern:*

Be it known that I, HENRY E. VAN NESS, a citizen of the United States, residing at Elmira, Chemung county, State of New York, have invented certain new and useful Improvements in Attachments for Milling-Machines, of which the following is a specification.

This invention relates to mechanism adapted to be attached to the ordinary milling machine for the purpose of conveniently and rapidly pointing the ends of gear teeth.

In gear changing mechanisms such as are employed in motor vehicles it is necessary to point the ends of the gear teeth in order to permit them to be moved axially into engagement and in the mechanism which I have devised the corners of the teeth are rounded so as to avoid having a sharp point which would be liable to be easily broken off in moving a gear into mesh with another which was rotating relatively thereto.

The novel features of the invention will be apparent from the following description, taken in connection with the accompanying drawings, in which, Figure 1 is a plan view of a mechanism embodying the invention; Fig. 2 is a side elevation of the same; Fig. 3 is a plan similar to Fig. 1 but showing the parts in a different position; Fig. 4 is a section on the line 4—4 of Fig. 1; Fig. 5 is a section on the line 5—5 of Fig. 1; Fig. 6 is a diagrammatic plan view showing the relation of a tooth to the cutter before and after the cutting operation; Fig. 7 is an elevation of the parts shown in Fig. 6; Fig. 8 is a plan of a gear having the teeth thereof pointed; and Fig. 9 is an end elevation of the same.

Referring to the drawings and more particularly to Figs. 8 and 9, it will be seen that each of the teeth has one end thereof pointed, the corners $a$ of the teeth being rounded on arcs of circles which intersect in a central radial line at the end of the tooth. It will be evident that by having the corners rounded, as shown, the points of the teeth will be strongly reinforced and capable of withstanding the shocks resulting from moving an idle gear into mesh with a rotating gear or vice versa.

In the mechanism illustrated, 10 indicates the work table of the ordinary milling machine which is adapted to be moved in the direction of the arrows in Fig. 1. To this table there is secured a plate 11 having slidably arranged thereon a plate 12, the latter being movable at right angles to the arrows in Fig. 1 and being secured to the plate 11 by means of clamping bolts 13 which engage slots 14 in the plate 12. The plate 11 has a recess in its upper side in which there is arranged the end of a lever 15, this lever being mounted on a pivot 16 on the plate 11 and having a slot 17 at its inner end which engages the pivot pin 18 on the under side of the plate 12. As will be readily understood, the plate 12 may be shifted on the plate 11 by means of this lever 15. For the purpose of holding the lever 15 I have provided a latch 19 which is adapted to engage either of the slots 20 or 21 in the plate 12, and when the parts are in the position shown in Fig. 1 the latch 19 engages the slot 20 and when the plate 12 is shifted to the other side the latch 19 engages the slot 21. The clamping bolts 13 are, of course, loosened when it is desired to shift the plate 12 and after the plate has been positioned the bolts will be tightened to securely hold the plate. The latch 19 may be actuated in any suitable manner as by means of the handle 22 which is pivoted to the lever 15 and also to the stem 23 of the latch. A spring 24 may be provided for the purpose of holding the latch in engagement with either of the slots 20 or 21. A support 25 is arranged on the plate 12 and connected therewith by means of a pivot 26. The plate 12 has a slideway 27 for the support 25 and at the opposite ends of this slideway there are arranged brackets 28 which carry adjustable set screws 29 for engaging the support 25 to limit the extent of movement thereof about the pivot 26. The plate 25 carries a boss or bearing 30 for the work-arbor 31. The arbor 31 is provided with a hand wheel 32 and an extension 33 upon which is secured the ratchet wheel 34. The work or gear 35 is secured on the end of the arbor 31 in any suitable manner and it will be observed from Figs. 1 and 3 that the axis of the pivot 26 is between the sides of the gear and adjacent the outer side thereof. Beneath the gear there is arranged a dog 36 which is normally held in engagement with the gear by means of a spring 37 carried by the support 25 (see Fig. 4). A lever 38 which is pivoted at 39 to a bracket 40 on the support 25 extends to the opposite side of the support and is pivotally connected with the dog 36. From Fig. 4 it will be evident that when the lever 38 is depressed the dog 36 will be disengaged from the gear 35 and permit the latter and the arbor 33 to be rotated. In the preferred form of the invention the dog 36 is so arranged that it will engage the gear so as to hold one of the teeth centrally over the axis of the arbor 31.

Pivotally secured on a lug 41 on the boss 30 is a lever 42 having its inner end 43 in engagement with the lever 38 and its outer end offset as at 44 and provided with a handle 45 arranged directly below a handle 46 on the support 25. The lever 42 carries a bracket 47 on which is pivoted a pawl 48 (see Fig. 5). The pawl 48 has a tail 49 which is adapted to engage the under side of the bracket 47 and the bracket has a pocket 50 for a spring 51 which engages the pawl and normally holds the tail 49 in engagement with the bracket. When the operator grasps the handle 46 and draws the handle 45 toward it the lever 38 will be depressed to disengage the dog 36 from the gear 35 and subsequently (see Fig. 5) the pawl 48 will engage one of the teeth on the ratchet wheel 34 and the continued upward movement of the lever 42 will carry the pawl to the dotted position shown in Fig. 5 and thus rotate the ratchet wheel an amount equal to the distance between two successive teeth thereon. The ratchet wheel is preferably provided with the same number of teeth as the gear to be cut and therefore in operating the lever 42 the gear will be rotated, or indexed, to bring the next succeeding tooth into operative position directly over the axis of the arbor 31.

Arranged above the mechanism just described is the usual cutter shaft 52, the axis of which is substantially in line with the axis of the pivot 26 when the teeth are being pointed. The cutter shaft 52 is the usual cutter shaft of a milling machine and in the preferred form of the invention there are arranged on this shaft two spaced side cutters 53 and 54.

In the operation of the machine the table 10 is usually moved to the right of the position shown in Fig. 2, relatively to the shaft 52, for the purpose of indexing. When the work has been indexed by means of the handle 45 the support 25 is swung to a position midway between the stops 29 and in this position the axis of the work-arbor is parallel to the faces of the cutters 53 and 54. Assuming the plate 12 to be in the position shown in Fig. 1, the table 10 is then moved to the left to carry the gear into operative relation with the cutter 53. This relation is shown in Fig. 6 and it will be seen from this figure that the axis of the tooth T and the axis of the cutters intersect substantially on the axis of the pivot 26. When the table 10 has been moved as just described the tooth T will assume a position relative to the cutter 53 shown in full lines in Fig. 6. If the support 25 is now gradually swung around to the position shown in Fig. 1 the corner $c$ of the tooth will be fed against the side of the cutter and the tooth will finally assume the dotted position shown, and in moving to this position the corner of the tooth will be rounded by the cutter, the latter, of course, being assumed to be rotating in the usual manner. The tooth T will swing about the axis of the pivot 26 and the corner $c$ will be rounded on the arc of a circle about this axis. After the completion of this cutting operation the support 25 is again swung to the central position and the work indexed and the operation then repeated. This is continued until one corner of each of the teeth has been rounded, when the latch 19 is disengaged from the slot 20 and, after the bolts 13 have been loosened, the plate 12 is shifted to the position shown in Fig. 3, by means of the handle 15. The shifting of the plate 12 will carry the opposite side of the teeth of the gear into operative relation with the cutter 54 and then the support 25 is swung from the central position to that shown in Fig. 3 to round the corner $c'$ of the teeth. The operation is then repeated until all of the teeth have both of the corners $c$ and $c'$ rounded, when the work is complete.

It will be seen that I have provided a comparatively simple mechanism which is adapted to conveniently and rapidly round the corners of the teeth on arcs of circles, thus providing a strong point at the end of the tooth. It will be understood that, in the arrangement of parts shown, one size of gear may be cut, but, for other sizes it is only necessary to adjust the relation of the parts and to provide a ratchet wheel 34 having teeth corresponding with the number of teeth on the gear to be cut.

Having thus described the invention, what I claim and desire to secure by Letters Patent is:

1. In mechanism of the class described, the combination of a pivotally mounted support, a work-arbor thereon, a plurality of side-milling cutters, and means whereby said support is swung about its pivot, in either direction, to feed the work against either cutter.

2. In mechanism of the class described, the combination of a pivotally mounted support, a work-arbor thereon, a plurality of side-milling cutters having a common axis, and means whereby said support is swung about its pivot, in either direction, to feed the work against either cutter.

3. In mechanism of the class described, the combination of a pivotally mounted support, a work-arbor thereon, a side-milling cutter, the axis of which is substantially at right angles to the axis of the pivot of said support, means whereby said support is swung about its pivot to feed the work against the cutter, and means for indexing the work.

4. In mechanism of the class described, the combination of a pivotally mounted support, a work-arbor thereon, a plurality of side-milling cutters, means whereby said support is swung about its pivot, in either direction, to feed the work against either cutter, and means for indexing the work.

5. In mechanism of the class described, the combination of a pivotally mounted support, a work-arbor thereon, a plurality of side-milling cutters having a common axis, means whereby said support is swung about its pivot, in either direction, to feed the work against either cutter, and means for indexing the work.

6. In mechanism of the class described, the combination of a member adapted to be secured to the table of a milling machine, a support pivoted to said member, a work-arbor on said support, a pair of side-milling cutters having a common axis, and means whereby said support may be swung in either direction about its pivot, from a central position in which the work-arbor is at right angles to the axis of said cutters, to feed the work against either cutter.

7. In mechanism of the class described, the combination of a member adapted to be secured to the table of a milling machine, a support pivoted to said member, a work-arbor on said support, a pair of side-milling cutters having a common axis, means whereby said support may be swung in either direction about its pivot, from a central position in which the work-arbor is at right angles to the axis of said cutters, to feed the work against either cutter, and means for indexing the work.

8. In mechanism of the class described, the combination of a member adapted to be secured to the table of a milling machine, a member slidable on the first-mentioned member, a support pivoted to the second-mentioned member, a work-arbor on said support, a side-milling cutter, and means whereby said support is swung about its pivot to feed the work against said cutter.

9. In mechanism of the class described, the combination of a member adapted to be secured to the table of a milling machine, a member slidable on the first-mentioned member, a support pivoted to the second-mentioned member, a work-arbor on said support, a plurality of side-milling cutters having a common axis, and means whereby said support is swung about its pivot to feed the work against either of said cutters.

10. In mechanism of the class described, the combination of a member adapted to be secured to the table of a milling machine, a member slidable on the first-mentioned member, a support pivoted to the second-mentioned member, a work-arbor on said support, a plurality of side-milling cutters having a common axis, a lever operatively connected with said members so as to slide the second-mentioned member to move the work into operative relation with either cutter, and means whereby said support is swung about its axis to feed the work against either cutter.

11. In a mechanism for pointing gear teeth, the combination of a support, a gear-arbor thereon, a side-milling cutter, and means whereby said support is swung about an axis which is between the sides of the gear.

12. In a mechanism for pointing gear teeth, the combination of a support, a gear-arbor thereon, a side milling cutter, and means whereby said support is swung about a pivot the axis of which lies between the sides of the gear, the axis of the gear tooth being pointed and the axis of the cutter intersecting on the axis of said pivot.

13. In a mechanism for pointing gear teeth, the combination of a pivoted support, a gear-arbor thereon, a plurality of side-milling cutters having a common axis, the axis of the support pivot being between the sides of the gear, and the axis of the tooth being pointed and the axis of the cutters intersecting substantially on the axis of said pivot, and means whereby said support is swung about its pivot to feed the work against either of said cutters.

14. In a mechanism of the class described, the combination of a support, a work-arbor thereon, a side-milling cutter, and means whereby said work-arbor is swung so as to turn the work about an axis perpendicular to the axis of the work-arbor and the milling cutter, to feed the work against the side of said cutter and form a cylindrical surface on the work.

15. In a mechanism of the class described, the combination of a support, a work-arbor thereon, a pair of side-milling cutters having a common axis, and means whereby said support is swung about an axis to feed the ends of the teeth of a gear, mounted on said arbor, against said cutters to form cylindrical surfaces, at the corners of the teeth, having parallel elements.

In testimony whereof I affix my signature in presence of two witnesses.

HENRY E. VAN NESS.

Witnesses:
J. C. FERGUSON,
F. PALMITER.